US010079432B2

(12) United States Patent
Backes et al.

(10) Patent No.: US 10,079,432 B2
(45) Date of Patent: Sep. 18, 2018

(54) PARAMETER SCANNED TUNABLE ANTENNA

(71) Applicant: Honeywell International Inc., Morris Plains, NJ (US)

(72) Inventors: Glen Backes, Maple Grove, MN (US); Lisa Lust, Minneapolis, MN (US); Kelly Muldoon, Minneapolis, MN (US); Doug Carlson, Woodbury, MN (US)

(73) Assignee: Honeywell International Inc., Morris Plains, NJ (US)

( * ) Notice: Subject to any disclaimer, the term of this patent is extended or adjusted under 35 U.S.C. 154(b) by 357 days.

(21) Appl. No.: 14/863,653

(22) Filed: Sep. 24, 2015

(65) Prior Publication Data

US 2017/0093040 A1 Mar. 30, 2017

(51) Int. Cl.

| | |
|---|---|
| ***H01Q 5/30*** | (2015.01) |
| ***H01Q 23/00*** | (2006.01) |
| ***H04B 1/00*** | (2006.01) |
| ***H01Q 9/30*** | (2006.01) |
| ***H01Q 9/16*** | (2006.01) |
| ***H01Q 5/321*** | (2015.01) |

(52) U.S. Cl.

CPC ............... *H01Q 9/30* (2013.01); *H01Q 5/321* (2015.01); *H01Q 9/16* (2013.01)

(58) Field of Classification Search

CPC ............ H01Q 5/15; H01Q 9/30; H01Q 23/00; H01Q 5/30; H01Q 5/314; H04B 1/00; H04B 1/0053; H04B 1/006

See application file for complete search history.

(56) References Cited

U.S. PATENT DOCUMENTS

| | | | | |
|---|---|---|---|---|
| 8,432,234 | B2 * | 4/2013 | Manssen | H03H 7/40<br>333/17.3 |
| 9,716,311 | B2 * | 7/2017 | Greene | H01Q 1/50 |
| 2007/0155347 | A1 * | 7/2007 | Heuermann | H03H 7/40<br>455/107 |
| 2007/0200766 | A1 * | 8/2007 | McKinzie, III | H01Q 9/0442<br>343/700 MS |
| 2010/0022203 | A1 * | 1/2010 | Bonnet | H01Q 1/241<br>455/84 |
| 2012/0038524 | A1 * | 2/2012 | Song | H03H 7/38<br>343/703 |

* cited by examiner

*Primary Examiner* — Blane Jackson

(74) *Attorney, Agent, or Firm* — Schwegman Lundberg & Woessner, P.A.

(57) ABSTRACT

Generally discussed herein are techniques, software, apparatuses, and systems configured for tuning an antenna. In one or more embodiments, a system can include a monopole or dipole antenna, a hardware processor electrically coupled to the monopole or dipole antenna, an amplitude or power detector electrically coupled between the monopole or dipole antenna and the processor to receive signals reflected from the monopole or dipole antenna and determine an amplitude or power of the reflected signals, and a first impedance matching network electrically connected between a feed point of the monopole or dipole antenna and the detector, the first impedance matching network including a variable capacitor, the variable capacitor having a variable capacitance that is set by the hardware processor based on the amplitude or power of the reflected determined by the amplitude or power detector.

19 Claims, 5 Drawing Sheets

PARAMETER SCANNED TUNABLE ANTENNA

GOVERNMENT RIGHTS

This invention was made with United States Government support under Contract Number 14-G-3019-0004. The United States Government has certain rights in this invention.

BACKGROUND

An antenna can couple an electrical connection to an electromagnetic field. Antennas are typically used to transmit and receive signals between devices. Antennas can include conductors or other materials that interact with an electric field. An antenna can be multi-directional (e.g., omnidirectional) or unidirectional (often referred to as directional). Antenna performance is generally an important factor in establishing a successful communication link between devices.

SUMMARY

In one or more embodiments, a tunable antenna system can include a monopole or dipole antenna, a hardware processor electrically coupled to the monopole or dipole antenna, an amplitude or power detector electrically coupled between the monopole or dipole antenna and the processor to receive signals reflected from the monopole or dipole antenna and determine an amplitude or power of the reflected signals, and a first impedance matching network electrically connected between a feed point of the monopole or dipole antenna and the detector, the first impedance matching network including a variable capacitor, the variable capacitor having a variable capacitance that is set by the hardware processor based on the amplitude or power of the reflected signal determined by the amplitude or power detector.

In one or more embodiments, a method can include sending, by processing circuitry, one or more signals to a first variable capacitor of a first impedance matching network electrically connected between an antenna feed point of a monopole antenna or a dipole antenna and the processing circuitry, the one or more signals sweep the first variable capacitor through a plurality of first capacitor states, determining a plurality of amplitude values, each amplitude value corresponding to a signal reflected from the monopole or dipole antenna while the first variable capacitor is in a first capacitor state of the plurality of first capacitor states, and sending one or more signals to the first variable capacitor to set the first variable capacitor to a capacitor state of the plurality of first capacitor states, the capacitor state corresponding to the capacitor state that produced the signal reflected with the smallest amplitude so as to increase the power output of monopole or dipole antenna and reduce the power reflected by the monopole or dipole antenna.

In one or more embodiments, a non-transitory computer readable medium can include instructions stored thereon that, when executed by a machine, configure the machine to send one or more signals to a first variable capacitor of a first impedance matching network electrically connected to an antenna feed point of a monopole antenna or a dipole antenna, the one or more signals sweep the first variable capacitor through a plurality of first capacitor states, determine a plurality of amplitude values, each amplitude value corresponding to a signal reflected from the monopole or dipole antenna while the first variable capacitor is in a first capacitor state of the plurality of first capacitor states, and send one or more signals to the first variable capacitor to set the first variable capacitor to a capacitor state of the plurality of first capacitor states, the capacitor state corresponding to the capacitor state that produced the signal reflected with the smallest amplitude so as to increase the power output of monopole or dipole antenna and reduce the power reflected by the monopole or dipole antenna.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
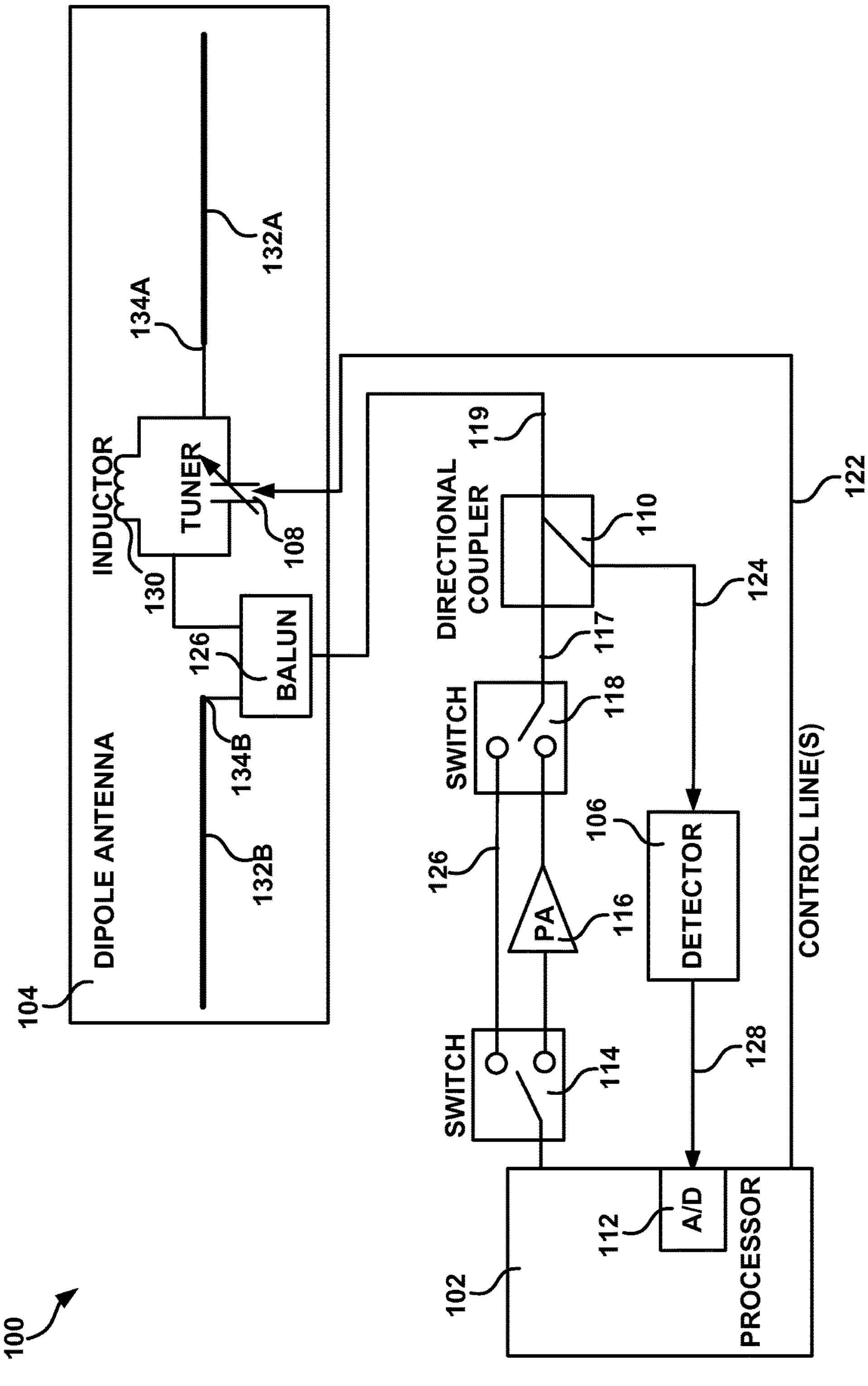
FIG. 1 is a block diagram of an example of a tunable antenna system, in accord with one or more embodiments.

While embodiments of this disclosure can take many different forms, specific embodiments thereof are shown in the drawings. and will be described herein in detail with the understanding that the present disclosure is to be considered as embodiments of the principles of the disclosure, as well as the best mode of practicing the same, and is not intended to limit the disclosure to the specific embodiments illustrated.

Overcoming radio frequency (RF) link budget constraints is a challenge, especially in operation of wireless devices. Most RF devices are susceptible to antenna performance degradation due to the proximity of a hand, head, or other object(s) which may be held close to a radiating antenna. Such antenna performance degradation can severely limit the effective range of communication, and in the case of devices with automatic level control, limit battery life due to excessive power draw of a transmit power amplifier (PA). The performance degradation is from the antenna becoming detuned (i.e. an impedance of the antenna not sufficiently matching an impedance of the external environment). This detuning effect is particularly pronounced when using electrically small, high Q antennas that have a narrow bandwidth. The amount of detuning is typically highly arbitrary and is difficult to tune the impedance in the development/production process due to the wide range of environmental conditions and corresponding detuning variance. Another problem is that damaging voltage levels incident to the transmit PA can occur as a result of a wave reflected from a de-tuned antenna. Discussed herein are systems, devices, and methods that can improve the ability to resist detuning of the antenna (e.g., a dipole or a monopole antenna). By automatically monitoring the response of an antenna, a correction signal can be applied to tunable elements which can counteract the effects of inadvertent loading.

Tuning at the input of a dipole or monopole antenna (i.e. the antenna feed point) requires a variable positive reactance to tune the resonant frequency of the antenna. This tunable element can include an electrically-tunable inductor, which would provide a tunable reactance. However, an electrically-tunable inductor is difficult to realize in a reasonable form factor. This is at least partially because the inductor would need tunable permeability, a tunable number of windings, and/or a physically moving ferrite materials in/out of proximity of the wires or other windings.

In various embodiments, a fixed series input inductor (which represents a non-tunable fixed positive reactance) is coupled in series or parallel with a tunable capacitor (tunable negative reactance). The reactance values of the two components, when in series, are summed together such that the tunable capacitor reactance tunes about the fixed positive inductor reactance. For example, if an inductor provides +20 Ohms of reactance at a certain frequency, and the tunable capacitor provides a tunable range from −1 to −10 Ohms of reactance, the net tunable reactance range is +10 to +19 Ohms. In this way, a positive reactance value can be tuned to change the resonant frequency of the antenna. In parallel, a reactance adds as an inverse, such that 1/total reactance=1/(reactance of capacitor)+1/(reactance of inductor).

An antenna can be sensitive to an electric field near (e.g., in the near-field of) the antenna. This electric field can be changed by objects in the vicinity of the antenna. For example, an electric field in the vicinity of an antenna can be affected by a hand, head, a surface, moisture, or other object or material in the vicinity of the antenna. This change in the electric field can cause an impedance mismatch between the antenna and the surrounding environment. The impedance mismatch can cause a portion of a signal to be transmitted by the antenna to be reflected, thus reducing the power of the transmitted signal. One or more embodiments discussed herein can help reduce the impedance mismatch and, as a result, can help increase an amplitude (e.g., power) of a transmitted signal.

Most RF devices are susceptible to antenna performance degradation, such as can be due to the proximity of a hand, head, or other object that can be close to the antenna. The degradation can be caused by an impedance mismatch that can be caused by a change in the environment around the antenna. This antenna degradation can reduce the effective range of communication, and in the case of devices with level control (e.g., automatic level control), can limit battery life due to excessive power consumption of a power amplifier (PA).

One or more embodiments discussed herein can help improve the ability of the antenna to resist detuning. By monitoring (e.g., automatically) a transmitted or reflected signal amplitude of an antenna, a correction signal can be provided to a tunable element that can help counteract the effects of inadvertent loading. The correction signal can alter an impedance of the tunable element, such as to help match an impedance of antenna to an impedance of the surrounding environment.

One or more embodiments discussed herein can determine a signal amplitude or power of a signal reflected from an antenna. Such an embodiment can use the reflected antenna signal amplitude or power as a variable to determine an impedance value (state) of one or more tunable electronic element(s) (e.g., a variable or fixed value capacitor, variable or fixed value inductor, variable or fixed value resistor, or a combination thereof) that provides a reduced reflected antenna signal amplitude or power (e.g., the least possible given the environmental conditions and the components that can be used to tune the impedance of the antenna). The least reflected amplitude or power can be an indication of maximized power delivery through the antenna, which can help in maximizing a radiated output power, given the circuit elements of the device.

In one or more embodiments, an RF transmitter can deliver power to an antenna through a low-loss path of a directional coupler. For a given condition of a perfectly tuned antenna (i.e. a perfect impedance match with the surrounding environment), there will be no reflected signal. Upon antenna loading (i.e. an impedance mismatch), such as can be caused by a hand, head or other object in the near field of an antenna, the resonant frequency of the antenna can change (e.g., the impedance of the antenna can change), causing a reflection at the original intended transmit frequency. This signal can reflect from the antenna back through the coupled port of the directional coupler. This reflected signal is electrically isolated from the "forward path" signal (the output from the PA), thus the reflected signal is representative of the signal as reflected from the antenna. The reflected signal can be detected with a circuit such as a diode detector and/or filter which can convert the RF signal to a proportional direct current (DC) voltage. This DC voltage can be sampled with an A/D converter for processing in a microcontroller, microprocessor, or other component(s) capable of such processing.

The tunable element(s) (e.g., a digitally tunable capacitor or varactor) can be swept in value (i.e. through a variety of states where each state can correspond to a different impedance value), and with each sweep point an A/D sample can be taken from a signal reflected by the antenna. The A/D samples can be compared to determine a state of the tunable element(s) that corresponds to the smallest reflected signal. The tunable element can be set to this state, such as during or prior to an RF transmission.

For such parameter scanning and tuning using a dipole or a monopole antenna, for example, a variable capacitor can be placed in series or parallel with a fixed value inductor between a directional coupler and near a feed point of one or more of the poles of the dipole or monopole antenna. Reference will now be made to the FIGS. to further describe details of embodiments of the disclosure.

FIG. 1 shows an example of a tunable antenna system 100, in accord with one or more embodiments. The system 100 can be a part of a radio transmitter, receiver, or transceiver. The system 100 can be a part of a phone (e.g., a smartphone, cellular phone, or other phone), tablet, desktop computer, base station, access point, thermostat, or other device that includes a radio receiver, transmitter, or transceiver. The system 100 can include a processor 102, an antenna 104 (e.g., a dipole antenna, a monopole antenna, or other antenna), a detector 106, and a tuner 108.

The processor 102, as illustrated, is electrically coupled to the detector 106, the tuner 108, and a switch 114, such as in parallel. The detector 106 is illustrated as being electrically coupled to the processor 102 through a connection 128 and to a directional coupler 110 through a connection 124. The switch 114, as illustrated, is electrically coupled, such as on alternative paths, to a power amplifier (PA) 116 and another switch 118. The switch 114 is illustrated as electrically coupled to the switch 118 through a bypass connection 126. The switch 118 is electrically coupled to a low loss path of the directional coupler 110 through the electrical connection 117. The directional coupler 110 is electrically coupled to the antenna 104 and the tuner 108, such as through the directional coupler output connection 119. The processor 102 is electrically coupled to the tuner 108 through one or more control lines 122.

The processor 102 can include one or more microprocessors or processing circuitry (e.g., combinational or state logic gates, or electrical components, such as resistors, transistors, capacitors, inductors, wires, diodes, or other electrical components) arranged (e.g., programmed) to perform operations as discussed herein. The operations of the processor 102 can be implemented in one or more modules. The processor 102 can be electrically coupled to one or more switches 114 or 118. The switch 114 or 118 can include a single pull double throw (SPDT) type of switch or other switch. A multiplexer, transistor, or other switching type device can be used in place of the switch 114 or 118. The processor 102 can send a signal to the antenna 104, such as can be transmitted by the antenna 104. The signal can pass through the switch 114 to the radio frequency (RF) power amplifier (PA) 116. The PA 116 can boost the power of a signal, such as to help increase a range of a signal transmitted by the antenna 104.

The PA 116 can be electrically coupled between the switches 114 and 118, such as shown in FIG. 1. The output of the PA 116 can be input to a directional coupler 110, such as through the electrical connection 117. The directional coupler 110 can provide a low loss path for the amplified signal to be transmitted to the antenna 104. The antenna 104 can transmit the signal from the coupler 110.

The signal from the directional coupler can be provided to a balun 126 of the antenna 104. The balun 126 converts an unbalanced signal (e.g., a signal from the directional coupler 110) to a balanced signal for the antenna 104. In embodiments in which the directional coupler output connection 119 is a coaxial connection and the antenna 104 is a dipole antenna, the coax can couple with one side of dipole and cause the coax to radiate and induce extra power draw (e.g., a common mode current). The balun 126 helps prevent this by balancing the unbalanced signal at the coaxial interface.

Figure 2:
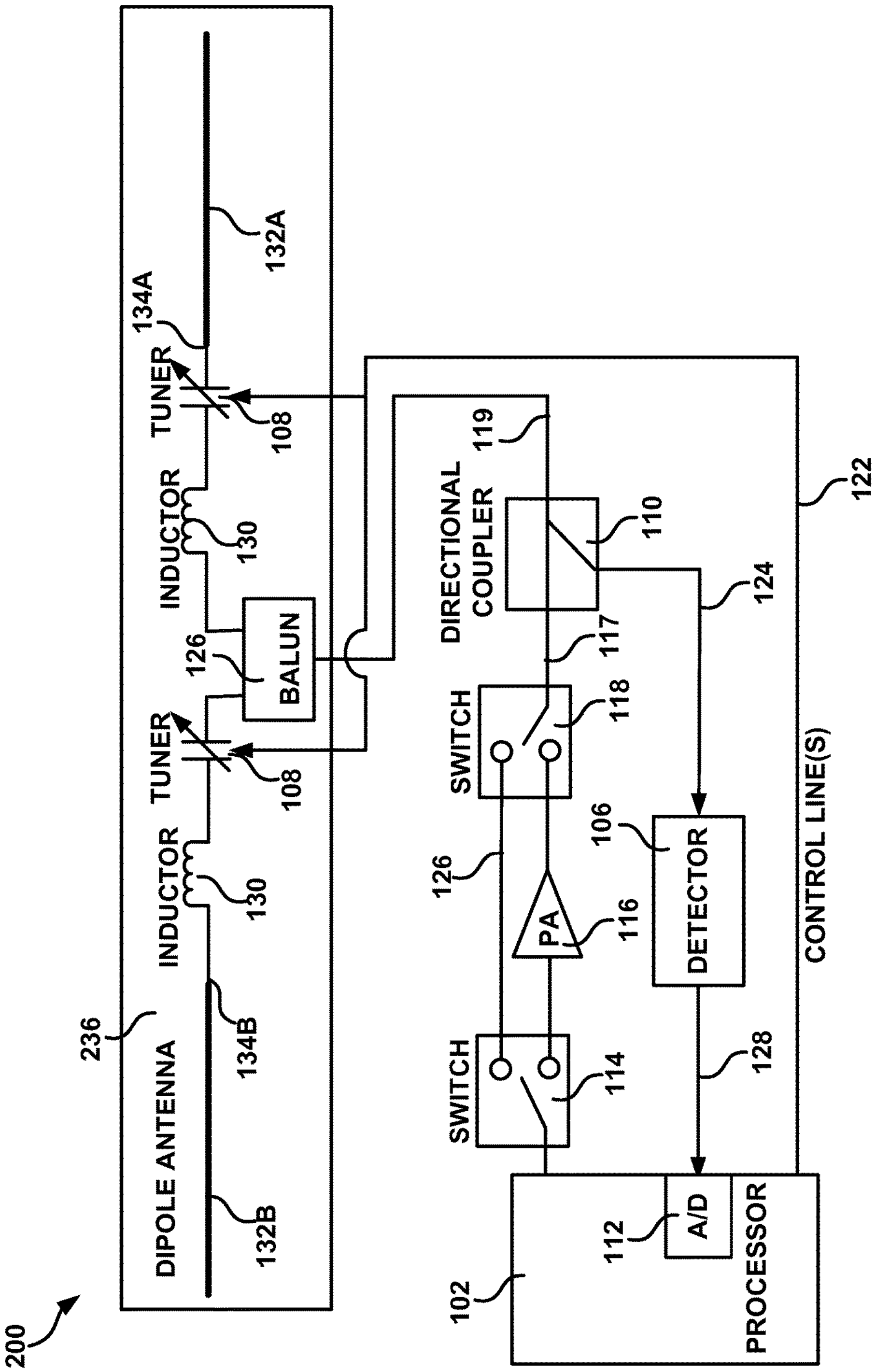
FIG. 2 is a block diagram of an example of another tunable antenna system, in accord with one or more embodiments.

A signal from the balun 126 can be provided to an inductor 130 (e.g., a fixed or variable value inductor) in parallel with a tunable capacitor 108. The signal from the impedance matching network (i.e. the inductor and capacitor) is radiated through a first pole 132A of the antenna 104. While the inductor and capacitor of the impedance matching network are shown as being in parallel, they could alternatively be in series as shown in FIG. 2.

In one or more embodiments, only one pole of the dipole antenna 104 includes an impedance matching network (i.e. the inductor 130 and the capacitor 108) (e.g., the first pole 132 as illustrated in FIG. 1) coupled between the balun 126 and an antenna feed point 134. In one or more other embodiments, both poles 132A and 132B of the dipole antenna each include an impedance matching network electrically coupled between the balun 126 and the antenna feed point 134A and 134B, respectively, such as shown in the system 200 of FIG. 2.

If an impedance of the antenna 104 does not match an impedance of the environment in which the antenna 104 is transmitting, a portion of the signal from the antenna 104 can be reflected back towards the directional coupler 110, such as through the impedance matching network, the balun 126, and/or the coupler output connection 119. The capacitor 108 can be a variable impedance device that can be adjusted to change the impedance of the antenna 104. The capacitor 108 can be electrically coupled between the antenna feed point 134A and the balun 126 or the directional coupler 110, such as in embodiments that do not include the balun 126. The capacitor 108 can be adjusted by transmitting a digital word on the control line(s) 122. Different digital words or voltages can correspond to different impedance values of the capacitor 108.

At least a portion of the signal reflected from the antenna 104 towards the directional coupler 110 can travel through a reflected signal connection 124 towards the detector 106. The detector 106 can determine an amplitude of a received signal (or a power if the received signal is passed through an impedance). The determined amplitude can be an analog signal that is sent through the connection 128 to an analog to digital (A/D) converter 112. The A/D converter 112 can process the analog signal so as to convert the analog signal to a digital word representative of the amplitude or power of the received signal. While FIG. 1 shows the A/D converter 112 as part of the processor 102, the A/D converter 112 can include a standalone chip or can be a part of the detector 106.

The antenna 104 can receive a signal, such as can be transmitted from a different antenna. The received signal can be directed to the directional coupler 110. The majority of the signal received at the directional coupler 110 can be transmitted to the switch 118 and through the bypass connection 126 and the switch 114 to the processor 102. The processor 102 can then interpret the signal from the bypass connection 126, such as to determine contents of a message being transmitted by the different antenna.

To help reduce the impedance mismatch between the antenna 104 and the environment external to and/or near the antenna 104, the processor 102 can transmit a signal to the capacitor 108, such as through one or more control line(s) 122, such as to set the capacitor 108 to a state. Each capacitor state of the capacitor 108 generally corresponds to a different impedance (e.g., capacitance). For example, the capacitor 108 can include a first impedance when the tuner is set to a first capacitor state and a second, different impedance when the capacitor is set to a second capacitor state. By having a variable impedance, the capacitor 108 can help in matching an impedance of the antenna 104 to an impedance of the surrounding environment.

The processor 102 can sweep the capacitor 108 through a plurality of capacitor states and (e.g., concurrently or after the capacitor is back in steady state, such as after the capacitor impedance is stable and generally unchanging) send one or more signals to the antenna 104 for each tuner state. Thus, the capacitor 108 can be set to a first state by the processor 102, a signal can be transmitted through the antenna 104, and a reflected signal from the antenna 104 can be received at the detector 106. This process can be repeated for one or more states of the capacitor 108, such as to sweep the capacitor 108 through multiple capacitor states. The amplitude(s) of the reflected signal(s), as determined by the detector 106 or the A/D converter 112, can be compared (e.g., by the processor 102), such as to determine a minimum, maximum, or a specified amplitude or power of a reflected signal. The processor 102 can then set the capacitor 108 to the state that corresponds to the minimum, maximum, or other specified amplitude or power of the reflected signal(s). In the case of a reflected signal, in one or more embodiments, the processor 102 can determine the amplitude that is the smallest of all the reflected signals and set the capacitor 108 to the state that corresponds to the smallest amplitude. This value of the capacitor 108 can cause a power of the transmitted signal to be maximized in accord with the current circuit and operating conditions (e.g., environment external to the antenna 104 or the circuitry of the system 100).

Since the environment external to the antenna 104 can change, the maximum transmission power of the antenna 104 can change. Similarly the state of the capacitor 108 that corresponds to the maximum output power of the antenna 104 can change with the external environment as well. To help alleviate the effects of the changing environment, the operations for sweeping and selecting the value for the capacitor 108 can be done multiple times, which can be at predetermined or dynamic times. For example, if the reflected signals over a period of time indicate that the antenna 104 is in a static condition, such as a condition of the device sitting on a table or being mounted on a wall, then it can be unnecessary to perform the tuning operation(s) frequently. In one or more embodiments, the processor 102 can dynamically adapt and learn how often to perform the tuning operation(s), such as to find a new state of antenna adjustment. Such an embodiment can have the added benefit of reducing DC power consumption by limiting the number of A/D conversions and that occur, while still increasing the power output of the antenna 104.

In one or more embodiments, the operations of sweeping the tunable element(s) (e.g., the capacitor 108) through the state(s) and setting the tunable element(s) to a value can be done periodically with relatively little time (e.g., fractions of a second to minutes) between sweeps. Such embodiments can be helpful for devices that are subject to external environments that change relatively often (e.g., phones, tablets, laptops, smart wearable devices, such as glasses or watches, or other devices).

In one or more embodiments, the operations of sweeping the tunable element(s) through the state(s) and setting the tunable element(s) to a value can be done periodically with a relatively large amount of time (e.g., hours, days, weeks, months, or years) between sweeps. Such embodiments can be helpful for devices that are subject to relatively static external environments (e.g., thermostats, desktop computers, smart monitors, base stations, smart televisions or video players, video game consoles, or other devices).

Note that other sweeping timeframes can be used, such as random time frames between sweeping, such as a user-initiated sweep or other. In one or more embodiments, an amplitude of a reflected or transmitted signal can be monitored and the tunable element(s) can be swept in response to determining the reflected or transmitted signal is greater than, less than, or equal to a predetermined threshold.

FIG. 2 shows an example of another tunable antenna system 200, in accord with one or more embodiments. The system 100 is similar to the system 100, with the system 200 including an impedance matching network connected at both poles of the antenna 236 (instead of an impedance matching network coupled to just a single pole 132A of the antenna 104, as discussed with regard to FIG. 1). The system 100 or 200 can be a part of a radio transmitter, receiver, transceiver, a phone (e.g., a smartphone, cellular phone, or other phone), tablet, desktop computer, thermostat, or other device that includes a radio. The system 200 can include the processor 102, the antenna 236, the detector 106, and the capacitor 108. The system 200 can include an additional capacitor 108 and an inductor coupled to the second pole 132B of the antenna 236. While the inductor and the capacitor are shown in series, they can alternatively be in parallel.

Similar to the system 100 of FIG. 1, the processor 102 can be electrically coupled to the one or more switches 114 or 118. The processor 102 can send a signal to the antenna 236, such as can be transmitted by the antenna 236. The signal can pass through the switch 114 to the RF PA 116.

The antenna 236 can receive a signal, such as can be transmitted from a different antenna. The received signal can be directed to the switch 118 and through the bypass connection 126, the switch 114, and to the processor 102. The processor 102 can then interpret the signal.

If an impedance of the antenna 236 does not match an impedance of the environment the antenna 236 is transmitting in, the amplitude or power of a signal received at the antenna 236 can be reduced.

The capacitor 108 can be a variable impedance device that can be adjusted to change the impedance of the capacitor 108 and can help match the impedance of the antenna 236 to the impedance of the external environment. The detector 106 can determine an amplitude of a signal received at the antenna 236 (or a power if the received signal is passed through an impedance).

To help reduce the impedance mismatch between the antenna 236 and the environment external to and/or near the antenna 236, the processor 102 can transmit a signal to the capacitor 108, such as through the one or more control line(s) 122, such as to set the capacitor 108 to a tuner state. Each state of the capacitor 108 can correspond to a different impedance.

The processor 102 can sweep the capacitor 108 through a plurality of states and (e.g., concurrently or after the capacitor is back in steady state, such as after the capacitor impedance is stable and generally unchanging) send one or more signals to the antenna 236 for each tuner state. Thus, the capacitor 108 can be set to a first state by the processor 102, a signal can be transmitted through the antenna 236, and a reflected signal from the antenna 236 can be reflected back to the directional coupler 110, such as through the balun 126 and the directional coupler output 119. This process can be repeated for one or more states of the capacitor 108, such as to sweep the capacitor 108 through states. The amplitudes of the reflected signal(s), as determined by the detector 106 or the A/D converter 112, can be compared (e.g., by the processor 102), such as to determine a minimum, maximum, or a specified amplitude of a reflected signal. The processor 102 can then set the capacitor 108 to the state that corresponds to the minimum, maximum, or other specified amplitude. In the case of a transmitted signal, in one or more embodiments, the processor 102 can determine the amplitude that is the largest of all the transmitted signals and set the capacitor 108 to the state that corresponds to the largest amplitude. This value of the capacitor 108 can cause a power of the transmitted signal to be maximized in accord with the current circuit and operating conditions (e.g., environment external to the antenna 236 and the components of the system 200).

Since the environment external to the antenna 236 can change, the maximum transmission power of the antenna 236 can change. Similarly the state of the capacitor 108 that corresponds to the maximum output power of the antenna 236 can change with the external environment as well. Thus, the capacitor 108 can be swept periodically or randomly through multiple tuner states and adjusted according to a reflected or transmitted value.

In one or more embodiments, the control line(s) 122 from the processor 102 to the capacitor 108 can be independent control lines, such as to require the processor 102 to provide a control signal for each capacitor 108 on a different control line 122. In one or more embodiments, the control line(s) 122 can carry the same signals to each of the capacitors 108. The signals can cause each of the capacitors 108 to be set to same or different states.

Figure 3:
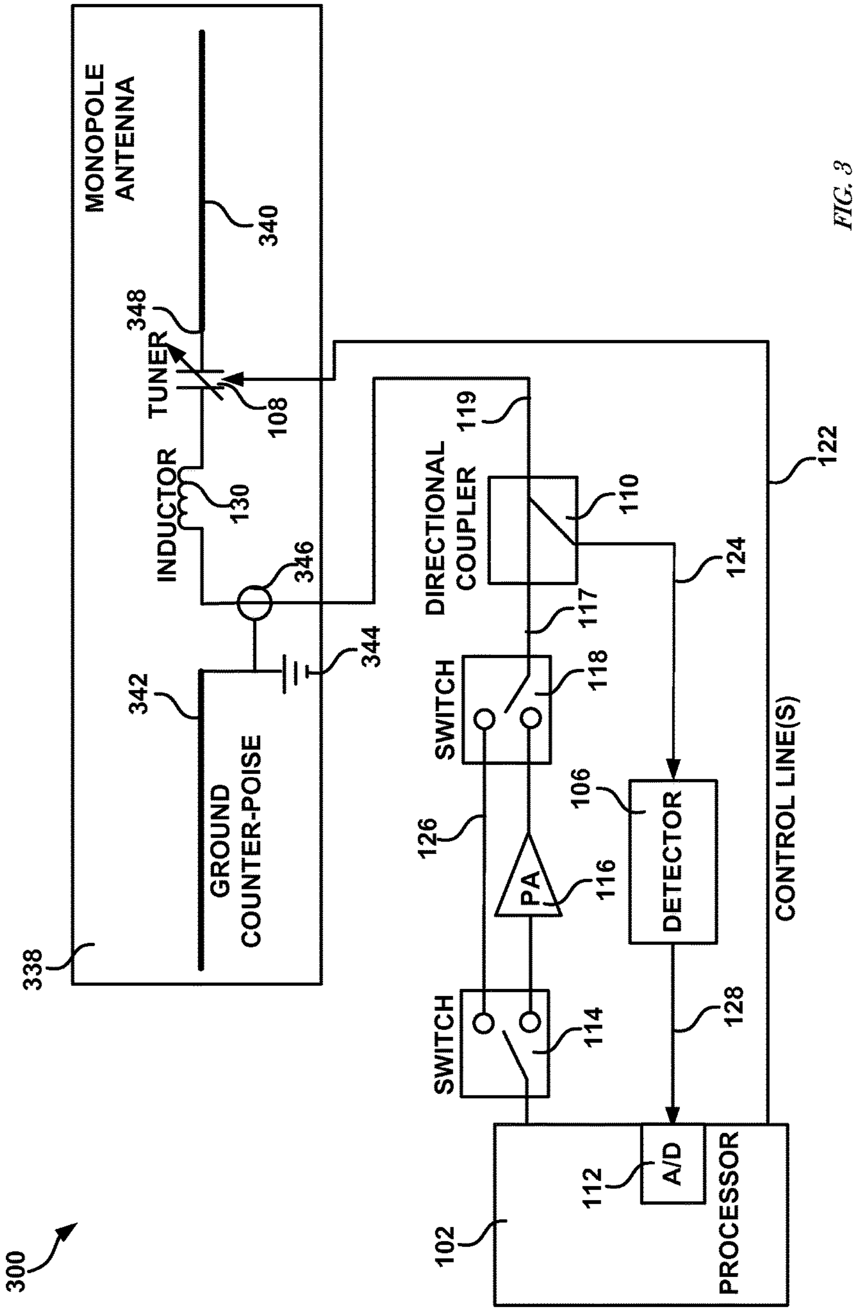
FIG. 3 is a block diagram of an example of yet another tunable antenna system, in accord with one or more embodiments.

FIG. 3 shows an example of another tunable antenna system 300, in accord with one or more embodiments. The system 300 can be similar to the system 100 with the system 300 including a monopole antenna 338 instead of a dipole antenna 104 or 236. The monopole antenna 338 includes one pole 340 and a ground counter-poise 342. The pole 340 radiates electromagnetic energy to transmit signals to another device. The ground counter-poise 342 is used as a substitute for earth ground, which is generally not a practical in mobile devices and other electronics systems. The ground counter-poise 342 is connected to a reference voltage (e.g., ground 344) of the system 300.

The monopole antenna 338 includes an impedance matching network connected between a coaxial sheath 346 (e.g., a ground connection on a coaxial connector) and an antenna feed point 348. The impedance matching network of the system 300 can be the same or different as the impedance matching network of the system 100 or 200. While the inductor and the capacitor are shown as being in series, they may alternatively be parallel to each other.

Similar to the system 100 or 200, the processor 102 can sweep the capacitor 108 through a plurality of states and (e.g., concurrently or after the capacitor is back in steady state, such as after the capacitor impedance is stable and generally unchanging) send one or more signals to the antenna 338 for each state. Thus, the capacitor 108 can be set to a first state by the processor 102, a signal can be transmitted through the antenna 338, and a transmitted signal from the antenna 338 can be reflected to the directional coupler 110, such as through the coupler output connection 119. This process can be repeated for one or more states of the capacitor 108, such as to sweep the capacitor 108 through the states. The amplitudes of the transmitted signal(s), as determined by the rectifier/detector 106 or the A/D converter 112, can be compared (e.g., by the processor 102), such as to determine a minimum, maximum, or a specified amplitude of a transmitted signal. The processor 102 can then set the capacitor 108 to the state that corresponds to the minimum, maximum, or other specified amplitude. In the case of a reflected signal, in one or more embodiments, the processor 102 can determine the amplitude that is the smallest of all the reflected signals and set the capacitor 108 to the state that corresponds to the smallest amplitude. This value of the capacitor 108 can cause a power of the transmitted signal to be maximized in accord with the current circuit and operating conditions (e.g., environment external to the antenna 338).

The operations of the processor 102, detector 106, A/D converter 112 capacitor 108, antenna 104, 236, or 338, or other elements of the systems 100, 200, or 300 can be performed automatically. As used herein, "automatically" means without human input or interference after deployment. That is, the changing of the states, determination of an amplitude or power of a reflected signal, comparison of the determined amplitudes, setting of the tuner state, and/or resultant changing of the capacitor state can occur without any human input or interference.

Figure 4:
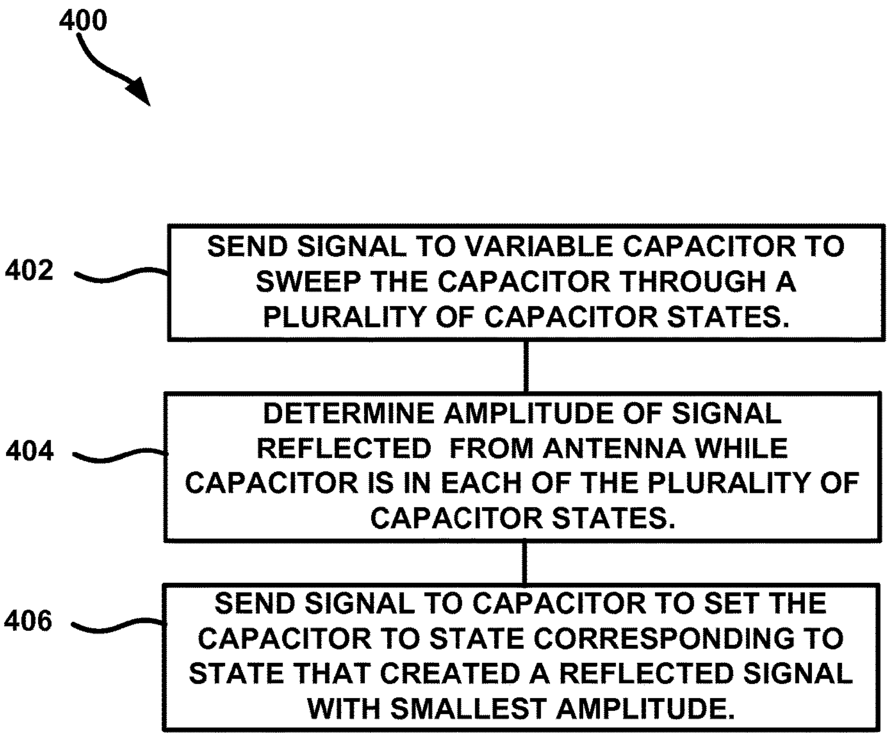
FIG. 4 is a flow diagram of an example of a method, in accord with one or more embodiments.

FIG. 4 shows a flow diagram of an example of a method 400, in accord with one or more embodiments. The method 400 as illustrated includes: sending one or more signals to a variable capacitor to sweep the capacitor through a plurality of capacitor states, at operation 402; determining an amplitude of one or more signals reflected from an antenna coupled to the variable capacitor while the variable capacitor is in each of the plurality of states, at operation 404; and sending one or more signals to the variable capacitor to set the capacitor to a state corresponding to the state that caused a reflected signal with the smallest amplitude, at operation 406. The operation at 402 can be performed by processing circuitry and the variable capacitor can be a part of an impedance matching network electrically coupled between an antenna feed point of a monopole antenna or a dipole antenna and the processing circuitry.

The method 400 can further include, wherein the antenna is a dipole antenna including a first pole and a second pole, wherein the first impedance matching network is electrically connected to the first pole. The method 400 can further include sending, by the processing circuitry, one or more signals to a second variable capacitor of a second impedance matching network electrically connected between an antenna feed point of the second pole and the processing circuitry, the one or more signals sweep the second variable capacitor through a plurality of second capacitor states. The method 400 can further include determining a plurality of amplitude values, each amplitude value corresponding to a signal reflected from the second pole while the second variable capacitor is in a second capacitor state of the plurality of second capacitor states. The method 400 can further include sending one or more signals to the second variable capacitor to set the second variable capacitor to a second capacitor state of the plurality of second capacitor states, the second capacitor state corresponding to the capacitor state that produced the signal reflected with the smallest amplitude so as to increase the power output of second pole and reduce the power reflected by the second pole.

The method 400 can further include sending a signal to the antenna while the variable capacitor is in each of the capacitor states. The method 400 can further include receiving, at an amplitude or power detector, a signal reflected from the antenna in each of the capacitor states. The operation at 404 can be performed by the amplitude or power detector and/or an analog to digital converter.

The method 400 can further include directing the reflected signal through a directional coupler, wherein the directional coupler includes a plurality of paths including a first path that provides a path for a majority of the reflected signal and a second path that provides a path for the remainder of the signal, wherein the detector is electrically coupled to the second path of the directional coupler and the reflected signal is directed through the second path of the directional coupler. The operation at 402 can include sending the one or more signals periodically. The operation at 406 can include sending the one or more signals to the first variable capacitor to set the first variable capacitor to a capacitor state of the plurality of capacitor states periodically. The method 400 can further include converting the determined amplitude to a digital word using an analog to digital converter.

Figure 5:
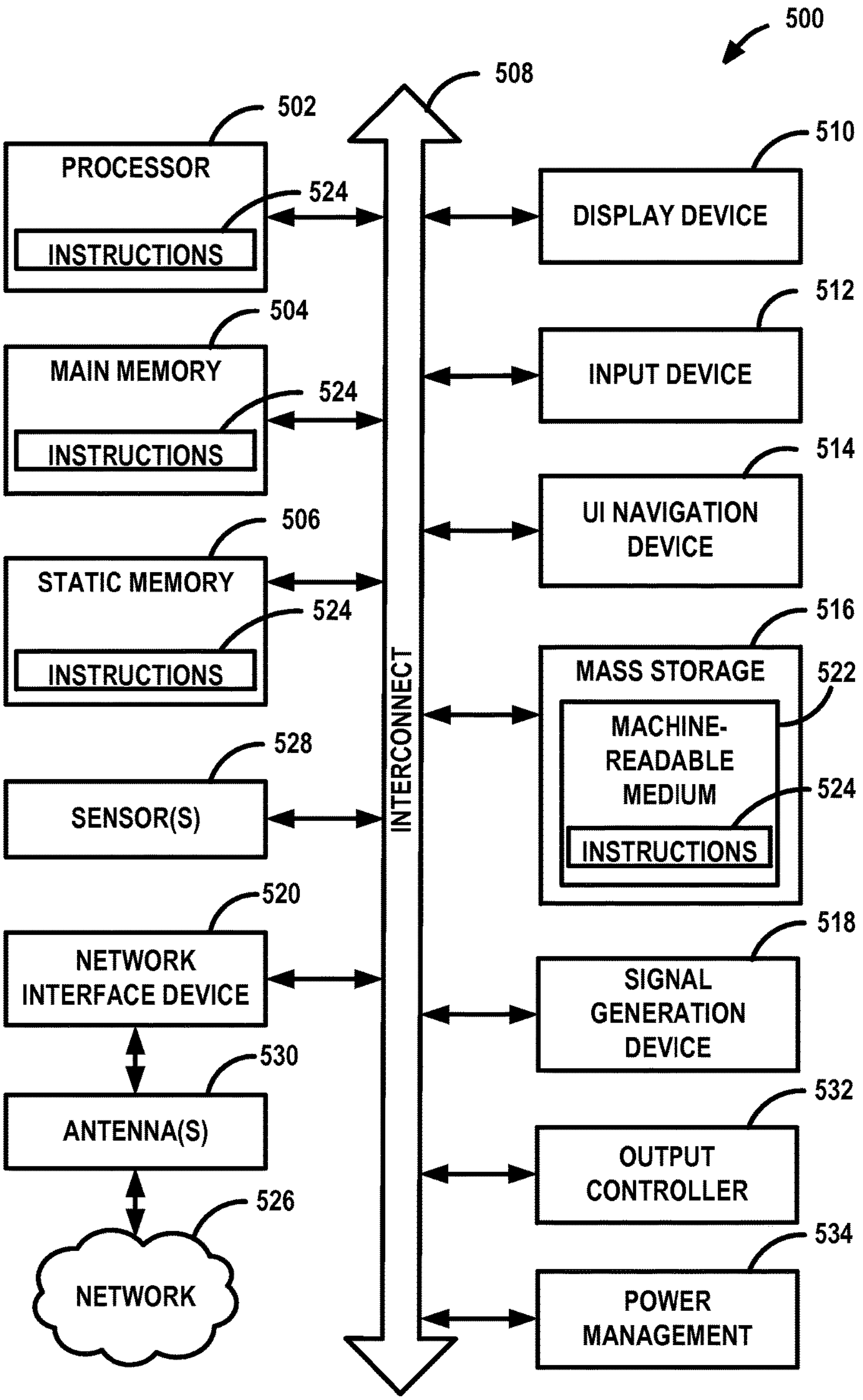
FIG. 5 is a block diagram of an example of a computing device system, in accord with one or more embodiments.

FIG. 5 is a block diagram illustrating an example computer system machine upon which any one or more of the techniques herein discussed can be run. In one or more embodiments, the processor 102, detector 106, or the system 100, 200, or 300 can include one or more items of computer system 500. Computer system 500 can be embodied as a computing device, providing operations of the processor 102 or any other processing or computing platform or component described or referred to herein. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The computer system machine can be a personal computer (PC), such as a PC that can be portable (e.g., a notebook or a netbook) or a PC that is not conveniently portable (e.g., a desktop PC), a tablet, a set-top box (STB), a gaming console, a Personal Digital Assistant (PDA), a mobile telephone or Smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Implementing techniques using computer processors and other logic can lead to automated camera condition change detection (e.g., that does not include human interference).

Example computer system 500 can include a processor 502 (e.g., a central processing unit (CPU), a graphics processing unit (GPU) or both), a main memory 504 and a static memory 506, which communicate with each other via an interconnect 508 (e.g., a link, a bus, etc.). The computer system 500 can further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are a touch screen display. The computer system 500 can additionally include a storage device 516 (e.g., a drive unit), a signal generation device 518 (e.g., a speaker), an output controller 532, a power management controller 534, or a network interface device 520 (which can include or operably communicate with one or more antennas 530, transceivers, or other wireless communications hardware), or one or more sensors 528, such as a GPS sensor, compass, location sensor, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, static memory 506, and/or within the processor 502 during execution thereof by the computer system 500, with the main memory 504, static memory 506, or the processor 502 also constituting machine-readable media. The processor 502 configured to perform an operation can include configuring instructions of a memory or other machine-readable media coupled to the processor, which when executed by the processor, cause the processor 502 to perform the operation.

While the machine-readable medium 522 is illustrated in an example embodiment to be a single medium, the term "machine-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 524 can further be transmitted or received over a communications network 526 using a transmission medium via the network interface device 520 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES AND EXAMPLES

The present subject matter can be described by way of several examples.

Example 1 can include or use subject matter (such as an apparatus, a method, a means for performing acts, or a device readable memory including instructions that, when performed by the device, can cause the device to perform acts), such as can include or use a monopole or dipole antenna, a hardware processor electrically coupled to the monopole or dipole antenna, an amplitude or power detector electrically coupled between the monopole or dipole antenna and the processor to receive signals reflected from the monopole or dipole antenna and determine an amplitude or power of the reflected signals, and a first impedance matching network electrically connected between a feed point of the monopole or dipole antenna and the detector, the first impedance matching network including a variable capacitor, the variable capacitor having a variable capacitance that is set by the hardware processor based on the amplitude or power of the reflected determined by the amplitude or power detector.

Example 2 can include or use, or can optionally be combined with the subject matter of Example 1, to include or use a directional coupler electrically coupled between the monopole or dipole antenna and the detector, wherein the directional coupler includes a plurality of paths including a first path that provides a path for a majority of the reflected signal to pass therethrough and a second path that provides a path for the remainder of the signal to pass therethrough, wherein the detector is electrically coupled to the second path of the directional coupler.

Example 3 can include or use, or can optionally be combined with the subject matter of Example 2, to include or use, wherein the antenna is a dipole antenna including a first pole and a second pole, the system further comprises a balun electrically connected between the first impedance matching network and the directional coupler, wherein the first impedance matching network is electrically connected between a first output or the balun and the first pole.

Example 4 can include or use, or can optionally be combined with the subject matter of Example 3, to include or use, wherein the system further comprises a second impedance matching network electrically connected between a second output of the balun and the second pole.

Example 5 can include or use, or can optionally be combined with subject matter of Example 4, to include or use, wherein the processor is programmed to send one or more signals to the first impedance matching network to sweep the variable capacitor of the first impedance matching network through a plurality of capacitor states, wherein each state corresponds to a different capacitance of the capacitor, the detector is to determine an amplitude or power of a signal reflected from the monopole or dipole antenna in each respective capacitor state, the processor is further programmed to send one or more signals to the variable capacitor to set the variable capacitor to a capacitor state of the plurality of capacitor states using the determined amplitudes or powers, the processor is programmed to send one or more signals to the second impedance matching network to sweep a second variable capacitor of the second impedance matching network through a plurality of capacitor states, wherein each state corresponds to a different capacitance of the capacitor, the detector is to determine an amplitude of a signal reflected from the second pole in each respective capacitor state, and the processor is further programmed to send one or more signals to the variable capacitor to set the variable capacitor to a capacitor state of the plurality of capacitor states corresponding to a reflected signal with a smallest amplitude.

Example 6 can include or use, or can optionally be combined with the subject matter of Example 2, to include or use, wherein the antenna is a monopole antenna, the first impedance matching network is electrically coupled between a radiating pole of the monopole antenna and the monopole antenna further comprises a ground counter-poise electrically coupled to a ground reference voltage of the system.

Example 7 can include or use, or can optionally be combined with the subject matter of Example 2, to include or use, wherein the capacitor state corresponds to a state of the variable capacitor that corresponds to a minimum amplitude of the determined amplitudes.

Example 8 can include or use, or can optionally be combined with the subject matter of Example 7, to include or use, wherein the processor is programmed to send the one or more signals to the variable capacitor to sweep the variable capacitor through the plurality of capacitor states periodically and set the variable capacitor to the capacitance that corresponds to the minimum amplitude of the determined amplitudes each period.

Example 9 can include or use, or can optionally be combined with the subject matter of at least one of Examples 1-8, to include or use, wherein the system further comprises an analog to digital converter to receive the determined amplitude and convert each of the determined amplitudes to a digital word.

Example 10 can include or use, or can optionally be combined with the subject matter of at least one of Examples 1-9, to include or use, wherein the impedance matching network includes a fixed value inductor electrically connected in series with the variable capacitor.

Example 11 can include or use, or can optionally be combined with the subject matter of at least one of Examples 1-10, to include or use, a switch electrically coupled to the processor, the switch including a plurality of electrical paths therethrough including a first electrical path for a signal to be transmitted by the antenna and a second path for a signal received by the antenna.

Example 12 can include or use subject matter (such as an apparatus, a method, a means for performing acts, or a device readable memory including instructions that, when performed by the device, can cause the device to perform acts), such as can include or use sending, by processing circuitry, one or more signals to a first variable capacitor of a first impedance matching network electrically connected between an antenna feed point of a monopole antenna or a dipole antenna and the processing circuitry, the one or more signals sweep the first variable capacitor through a plurality of first capacitor states, determining a plurality of amplitude values, each amplitude value corresponding to a signal reflected from the monopole or dipole antenna while the first variable capacitor is in a first capacitor state of the plurality of first capacitor states, and sending one or more signals to the first variable capacitor to set the first variable capacitor to a capacitor state of the plurality of first capacitor states, the capacitor state corresponding to the capacitor state that produced the signal reflected with the smallest amplitude so as to increase the power output of monopole or dipole antenna and reduce the power reflected by the monopole or dipole antenna.

Example 13 can include or use, or can optionally be combined with the subject matter of Example 12, to include or use, wherein the antenna is a dipole antenna including a first pole and a second pole, wherein the first impedance matching network is electrically connected to the first pole, wherein the method further comprises sending, by the processing circuitry, one or more signals to a second variable capacitor of a second impedance matching network electrically connected between an antenna feed point of the second pole and the processing circuitry, the one or more signals sweep the second variable capacitor through a plurality of second capacitor states, determining a plurality of amplitude values, each amplitude value corresponding to a signal reflected from the second pole while the second variable capacitor is in a second capacitor state of the plurality of second capacitor states, and sending one or more signals to the second variable capacitor to set the second variable capacitor to a second capacitor state of the plurality of second capacitor states, the second capacitor state corresponding to the capacitor state that produced the signal reflected with the smallest amplitude so as to increase the power output of second pole and reduce the power reflected by the second pole.

Example 14 can include or use, or can optionally be combined with the subject matter of at least one of Examples 12-13, to include or use directing the reflected signal through a directional coupler, wherein the directional coupler includes a plurality of paths including a first path that provides a path for a majority of the reflected signal and a second path that provides a path for the remainder of the signal, wherein the detector is electrically coupled to the second path of the directional coupler and the reflected signal is directed through the second path of the directional coupler.

Example 15 can include or use, or can optionally be combined with the subject matter of at least one of Examples 12-14, to include or use, wherein sending, by processing circuitry, one or more signals to the first variable capacitor to sweep the first variable capacitor through a plurality of first capacitor states includes sending the one or more signals periodically and sending one or more signals to the first variable capacitor to set the first variable capacitor to a capacitor state of the plurality of capacitor states includes sending the one or more signals to the first variable capacitor to set the first variable capacitor to a capacitor state of the plurality of capacitor states periodically.

Example 16 can include or use, or can optionally be combined with the subject matter of at least one of Examples 12-15, to include or use converting the determined amplitude to a digital word using an analog to digital converter.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in this document, the terms "first," "second," and "third," etc. are used merely as labels, and are not intended to impose numerical requirements on their objects.

From the foregoing, it will be observed that numerous variations and modifications can be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Although a few embodiments have been described in detail above, other modifications are possible. For example, the logic flows depicted in the FIGS. do not require the particular order shown, or sequential order, to achieve desirable results. Other steps can be provided, or steps can be eliminated, from the described flows, and other components can be added to, or removed from, the described systems. Other embodiments can be within the scope of the following claims.

The invention claimed is:

1. A tunable antenna system comprising:

a dipole antenna including a balun, a first element, and a second element;

a hardware processor electrically coupled to the monopole or dipole antenna;

an amplitude or power detector electrically coupled between the dipole antenna and the processor to receive signals reflected from the dipole antenna and determine an amplitude or power of the reflected signals;

a directional coupler electrically coupled between the balun of the dipole antenna and the amplitude or power detector; and a first impedance matching network electrically connected between the first element and a first output of the balun, the first impedance matching network including a variable capacitor, the variable capacitor having a variable capacitance that is set by the hardware processor based on the amplitude or power of the reflected signal determined by the amplitude or power detector.

2. The system of claim 1, wherein the system further comprises a second impedance matching network electrically connected between a second output of the balun and the second element.

3. The system of claim 2, wherein:

the hardware processor is programmed to send one or more signals to the first impedance matching network to sweep the variable capacitor of the first impedance matching network through a plurality of capacitor states, wherein each state corresponds to a different capacitance of the capacitor, the amplitude or power detector is to determine an amplitude or power of a signal reflected from the dipole antenna in each respective capacitor state, the hardware processor is further programmed to send one or more signals to the variable capacitor to set the variable capacitor to a capacitor state of the plurality of capacitor states using the determined amplitudes or powers, the hardware processor is programmed to send one or more signals to the second impedance matching network to sweep a second variable capacitor of the second impedance matching network through a plurality of capacitor states, wherein each state corresponds to a different capacitance of the capacitor, the amplitude or power detector is to determine an amplitude of a signal reflected from the second element in each respective capacitor state, and the processor is further programmed to send one or more signals to the variable capacitor to set the variable capacitor to a capacitor state of the plurality of capacitor states corresponding to a reflected signal with a smallest amplitude.

4. The system of claim 1, wherein the capacitor state corresponds to a state of the variable capacitor that corresponds to a minimum amplitude of the determined amplitudes.

5. The system of claim 4, wherein the hardware processor is programmed to send the one or more signals to the variable capacitor to sweep the variable capacitor through the plurality of capacitor states periodically and set the variable capacitor to the state that corresponds to the minimum amplitude of the determined amplitudes each period.

6. The system of claim 1, wherein the system further comprises an analog to digital converter to receive the determined amplitude and convert each of the determined amplitudes to a digital word.

7. The system of claim 1, wherein the impedance matching network includes a fixed value inductor electrically connected in series with the variable capacitor.

8. The system of claim 1, further comprising a switch electrically coupled to the processor, the switch including a plurality of electrical paths therethrough including a first electrical path for a signal to be transmitted by the antenna and a second path for a signal received by the antenna.

9. A method comprising:

sending, by processing circuitry, one or more signals to a first variable capacitor of a first impedance matching network electrically connected between a balun and a first element of a dipole antenna, the one or more signals sweep the first variable capacitor through a plurality of first capacitor states;

determining a plurality of amplitude values, each amplitude value corresponding to a signal reflected from the dipole antenna and through a directional coupler to an amplitude or power detector while the first variable capacitor is in a first capacitor state of the plurality of first capacitor states; and sending one or more signals to the first variable capacitor to set the first variable capacitor to a capacitor state of the plurality of first capacitor states, the capacitor state corresponding to the capacitor state that produced the signal reflected with the smallest amplitude so as to increase the power output of the dipole antenna and reduce the power reflected by the dipole antenna.

10. The method of claim 9, wherein the dipole antenna further includes a second element, and wherein the method further comprises:

sending, by the processing circuitry, one or more signals to a second variable capacitor of a second impedance matching network electrically connected between the balun and the second element, the one or more signals sweep the second variable capacitor through a plurality of second capacitor states;

determining a plurality of amplitude values, each amplitude value corresponding to a signal reflected from the second element while the second variable capacitor is in a second capacitor state of the plurality of second capacitor states; and sending one or more signals to the second variable capacitor to set the second variable capacitor to a second capacitor state of the plurality of second capacitor states, the second capacitor state corresponding to the capacitor state that produced the signal reflected with the smallest amplitude so as to increase the power output of second element and reduce the power reflected by the second element.

11. The method of claim 9, wherein sending, by processing circuitry, one or more signals to the first variable capacitor to sweep the first variable capacitor through a plurality of first capacitor states includes sending the one or more signals periodically and sending one or more signals to the first variable capacitor to set the first variable capacitor to a capacitor state of the plurality of capacitor states includes sending the one or more signals to the first variable capacitor to set the first variable capacitor to a capacitor state of the plurality of capacitor states periodically.

12. The method of claim 9, further comprising converting the determined amplitude to a digital word using an analog to digital converter.

13. A non-transitory computer readable medium comprising instructions stored thereon that, when executed by a machine, configure the machine to:

send one or more signals to a first variable capacitor of a first impedance matching network electrically connected between a balun and a first element of a dipole antenna, the one or more signals sweep the first variable capacitor through a plurality of first capacitor states;

determine a plurality of amplitude values, each amplitude value corresponding to a signal reflected from the dipole antenna while the first variable capacitor is in a first capacitor state of the plurality of first capacitor states; and send one or more signals to the first variable capacitor to set the first variable capacitor to a capacitor state of the plurality of first capacitor states, the capacitor state corresponding to the capacitor state that produced the signal reflected with the smallest amplitude so as to increase the power output of the dipole antenna and reduce the power reflected by the dipole antenna.

14. The computer readable medium of claim 13, wherein the instructions further comprise instructions which, when executed by the machine, configure the machine to:

send one or more signals to a second variable capacitor of a second impedance matching network electrically connected between the balun and a second element of the dipole antenna, the one or more signals sweep the second variable capacitor through a plurality of second capacitor states;

determining a plurality of amplitude values, each amplitude value corresponding to a signal reflected from the second pole while the second variable capacitor is in a second capacitor state of the plurality of second capacitor states; and sending one or more signals to the second variable capacitor to set the second variable capacitor to a second capacitor state of the plurality of second capacitor states, the second capacitor state corresponding to the capacitor state that produced the signal reflected with the smallest amplitude so as to increase the power output of second element and reduce the power reflected by the second element.

15. The computer readable medium of claim 13, wherein the instructions for sending one or more signals to the first variable capacitor to sweep the first variable capacitor through a plurality of first capacitor states include instructions for sending the one or more signals periodically and the instructions for sending one or more signals to the first variable capacitor to set the first variable capacitor to a capacitor state of the plurality of capacitor states include instructions for sending the one or more signals to the first variable capacitor to set the first variable capacitor to a capacitor state of the plurality of capacitor states periodically.

16. The computer readable medium of claim 15, further comprising instructions, which when executed by the machine, configure the machine to convert the determined amplitude to a digital word using an analog to digital converter and wherein the instructions for send one or more signals to the first variable capacitor to set the first variable capacitor to a capacitor state of the plurality of first capacitor states include instructions for sending the one or more signals based on the digital word.

17. A tunable antenna system comprising:

a monopole antenna including a radiating element;

a coaxial connector including a ground connected sheath and an internal connector, the internal connector electrically coupled to the radiating element;

a hardware processor electrically coupled to the monopole antenna;

an amplitude or power detector electrically coupled between the monopole antenna and the processor to receive signals reflected from the monopole antenna and determine an amplitude or power of the reflected signals;

a directional coupler electrically coupled between the internal connector and the amplitude or power detector; and an impedance matching network electrically connected between the radiating element and the internal connector, the impedance matching network including a variable capacitor, the variable capacitor having a variable capacitance that is set by the hardware processor based on the amplitude or power of the reflected signal determined by the amplitude or power detector.

18. The system of claim 17, wherein:

the hardware processor is programmed to send one or more signals to the impedance matching network to sweep the variable capacitor of the impedance matching network through a plurality of capacitor states, wherein each state corresponds to a different capacitance of the capacitor, the amplitude or power detector is to determine an amplitude or power of a signal reflected from the monopole antenna in each respective capacitor state, and the hardware processor is further programmed to send one or more signals to the variable capacitor to set the variable capacitor to a capacitor state of the plurality of capacitor states using the determined amplitudes or powers.

19. The system of claim 18, wherein the capacitor state corresponds to a state of the variable capacitor that corresponds to a minimum amplitude of the determined amplitudes.

* * * * *